United States Patent

Hemmerich

[11] Patent Number: 5,768,755
[45] Date of Patent: Jun. 23, 1998

[54] TENTER CLIP HAVING A ROLLER BEARING

[75] Inventor: Guenter Hemmerich, St. Ingbert, Germany

[73] Assignee: Hoechst Trespaphan GmbH, Neunkirchen, Germany

[21] Appl. No.: 831,006

[22] Filed: Mar. 31, 1997

[30] Foreign Application Priority Data

Apr. 4, 1996 [DE] Germany .................. 196 13 562.1

[51] Int. Cl.⁶ .................................................. D06C 3/04
[52] U.S. Cl. ................................................. 26/93; 26/89
[58] Field of Search .................................. 26/93, 94, 95, 26/96, 89, 52; 198/803.3, 803.4, 803.7, 803.14, 838, 845; 226/173

[56] References Cited

U.S. PATENT DOCUMENTS

| | | | |
|---|---|---|---|
| 3,457,608 | 7/1969 | Gageur | 26/93 |
| 3,469,291 | 9/1969 | Gageur | 26/93 |
| 3,500,515 | 3/1970 | Cunningham et al. | 26/93 |
| 3,580,451 | 5/1971 | Fraitzl | 26/93 |
| 4,134,189 | 1/1979 | Richter | 26/93 |
| 4,674,159 | 6/1987 | Sclater et al. | 26/93 |
| 4,879,788 | 11/1989 | Suzuki et al. | 26/94 |
| 5,081,750 | 1/1992 | Molz | 26/93 |
| 5,101,965 | 4/1992 | Rutz et al. | 198/803.7 |
| 5,159,733 | 11/1992 | Fleming, Jr. et al. | 26/93 |
| 5,267,378 | 12/1993 | Wellenhofer et al. | 26/93 |
| 5,287,958 | 2/1994 | Steffl | 198/838 |
| 5,497,957 | 3/1996 | Michel | 242/534 |
| 5,613,284 | 3/1997 | Hosmer | 26/93 |

FOREIGN PATENT DOCUMENTS

| | | | |
|---|---|---|---|
| 2 686 041 | 7/1993 | France . | |
| 1 635 250 | 3/1973 | Germany . | |
| 2749119 | 5/1979 | Germany | 26/93 |
| 29 49 858 | 4/1982 | Germany . | |
| 39 39 086 | 10/1995 | Germany . | |
| 61-124462 | 6/1986 | Japan . | |
| 2 065 186 | 6/1981 | United Kingdom . | |
| 2032975 | 5/1990 | United Kingdom | 26/93 |

*Primary Examiner*—Amy B. Vanatta
*Attorney, Agent, or Firm*—Foley & Lardner

[57] ABSTRACT

A tenter clip is fastened on a double-T web support of a film stretching machine and has a flexible, vertically clamped guide strip, against which horizontal running rollers bear. Each of these running rollers is equipped with a covering for dust protection. The tenter clip comprises a clamping body and a rolling part. The three horizontal running rollers and the vertical running roller of the clamping body are covered by a protective hood, the shape of which is matched to the geometry of the running rollers.

15 Claims, 3 Drawing Sheets

TENTER CLIP HAVING A ROLLER BEARING

BACKGROUND OF THE INVENTION

The invention relates to a tenter clip having at least one roller bearing, fastened in a web support of a film stretching machine, having a flexible, vertically clamped guide strip, against which horizontal roller bearings bear from both sides, and having a vertical roller bearing, over which a tenter chain is guided.

For the purpose of orientation in the transverse direction, films which are to be stretched biaxially are guided through a so-called transverse stretching frame. This transverse stretching frame has a double-T support, through which a tenter chain runs. Tenter clips, which, as gripper elements, grasp the film web in the edge region, are fastened on the tenter chain. Roller bearings, over which the tenter chain runs, are situated in the tenter clips, these roller bearings generally comprising deep groove ball bearings, which during production are provided with a long-acting lubricant.

A tenter chain made of tenter clips having a roller bearing in the tenter frame of a film stretching machine is known from DE-C-16 35 250, which chain has a flexible, continuous and vertically clamped guide rail, against which the horizontal roller bearings, which take up the horizontal clamping forces, bear from both sides, the weight of the tenter chain being supported by vertical roller bearings. The guide rail is clamped such that running surfaces for the horizontal roller bearings of the tenter clips are formed both above and below the clamping location, essentially symmetrically to the plane of the material being treated. In this case, the guide rail is clamped on a web or peg which is arranged on the rear wall of a housing surrounding the endless tenter chain. The housing completely surrounds the tenter clip and therefore takes up a very large amount of space and increases the weight of the tenter clip considerably, so that the tenter chain has a high weight, as a result of which the structure of the clamping frame of the film stretching machine becomes correspondingly heavy and structurally complex.

DE-C-29 49 858 describes an endless tenter chain in a clamping frame for the longitudinal and transverse stretching of webs of material. The tenter chain has an endless chain support comprising sections which are connected to one another in an articulated manner. Jointless and continuous running rails and support rails of round profile are integrated in the endless chain support, having bridging members which are arranged in the bends between the sections. The bridge members connect the ends of the running rails and support rails and are formed in the manner of coil springs. The running rails and support rails are mounted above one another in holding bearings arranged in a vertical plane, the ends of the running rails and support rails being connected to one another by means of a composite spring assembly in the bends of the sections of the endless chain support. The spring assembly comprises leaf springs which are arranged on both sidles of a square flexible bar and are supported against the inner surface of the bridging member. The square flexible bar is guided through the bridging member.

DE-C-39 39 086 discloses a tenter clip having a roller bearing. The clip, in guides running parallel to one another, on the one hand is held vertically by a support roller arranged in the clip body and on the other hand is guided horizontally by a pair of roller bearings mounted axially parallel and rotatably movably in cover plates. This pair of roller bearings takes up the forces which act horizontally on the clip, the rotationally movable bearing of the roller bearings arranged axially parallel being effected by means of a chain pin which simultaneously forms the articulated connection between the individual clips forming the tenter chain.

Due to the increase in the production rate, so-called "oil spots" are formed on the films when the films are stretched. These spot-like contaminants on the film are formed by the bearing grease of the roller bearings of the tenter clips which form the tenter chain. These contaminants are formed to a particularly strong degree at high production rates and at high temperatures. The freshly greased roller bearings tend to release partial amounts of their bearing grease as a grease mist. Due to the turbulent flow conditions in the region of the tenter chain, this grease mist also spreads out in the direction of the film and is deposited in the edge region of the film. The resulting grease spots are particularly noticeable as imperfections following the metallization of electric foils.

In order to avoid such contaminants on the film, inter alia a metal-sheetlike covering has been placed on the edge of the tenter chain, in the direction towards the film.

However, this covering leads to a less effective heating of the edge of the film and thus to wider seam strips, since the unstretched edge region of the film becomes wider due to the less effective heating. The wider seam strips and the limited utilization of the width of the film results in increased raw material costs.

SUMMARY OF THE INVENTION

One primary object of the invention is therefore to provide improved tenter clips such that lubricants from the roller bearings of the tenter clips are prevented from being deposited on the film, without resulting in wider seam strips of the film and without the external dimensions of the tenter clips having to be increased due to corresponding shielding means.

This object is achieved according to the invention in that the tenter clip comprises a clamping body and a rolling part, the clamping body comprising horizontal and vertical roller bearings and being covered by a protective hood, the shape of which is matched to the geometry of the roller bearings, so that lubricant mist from the roller bearings is deposited on the inner side of the protective hood.

In a refinement of the invention, the protective hood has two holes on the top side, which holes align with corresponding threaded holes in the clamping body, and the protective hood is fastened on the clamping body by means of screws which are guided through the holes and are screwed into the threaded holes.

Further refinement of the invention includes having three horizontal roller bearings of the clamping body arranged in the form of a triangle in a plane, and the film clamping plane runs centrically in the longitudinal direction with respect to the roller bearings.

The individual tenter clip is covered so effectively by the complete screening of the roller bearings by the protective hood that the lubricant mist is deposited on the inside of the protective hood and thus can no longer contaminate the film. Further advantages of the invention are the protection of the roller bearings in the event of the film tearing and the prevention of contamination of the roller bearings by external effects, such as for example substances emanating from the film. If the film tears, remainders of film which are still hanging in the chain links can become wound around the roller bearings, which results in interference with the transportation of the tenter chain. If the film tears during production, it is necessary to stop the tenter chain, since the film remainders can only be removed from the roller bearings mechanically and with a great deal of effort.

Direct covering of the individual roller bearings as dust protection is generally not sufficient to prevent lubricant mist from leaving the roller bearings to the desired extent, since leaks in the covering often occur during operation at relatively high production rates. Compared to completely sealed roller bearings, the protective hood according to the invention provides considerable advantages in terms of cost, since sealed roller bearings are twice as expensive as unsealed roller bearings. In view of the large number of roller bearings in a tenter chain, this results in an unacceptable increase in the cost of the tenter chain.

Further objects, features and advantages of the present invention will become apparent from the detailed description of the preferred embodiments which follows, when considered together with the appended figures of drawing.

BRIEF DESCRIPTION OF THE DRAWINGS

The accompanying drawings, which are incorporated in and constitute a part of the specification, illustrate a presently preferred embodiment of the invention, and, together with the general description given above and the detailed description given below, serve to explain the principles of the invention.

DETAILED DESCRIPTION OF THE PREFERRED EMBODIMENTS

Figure 1:
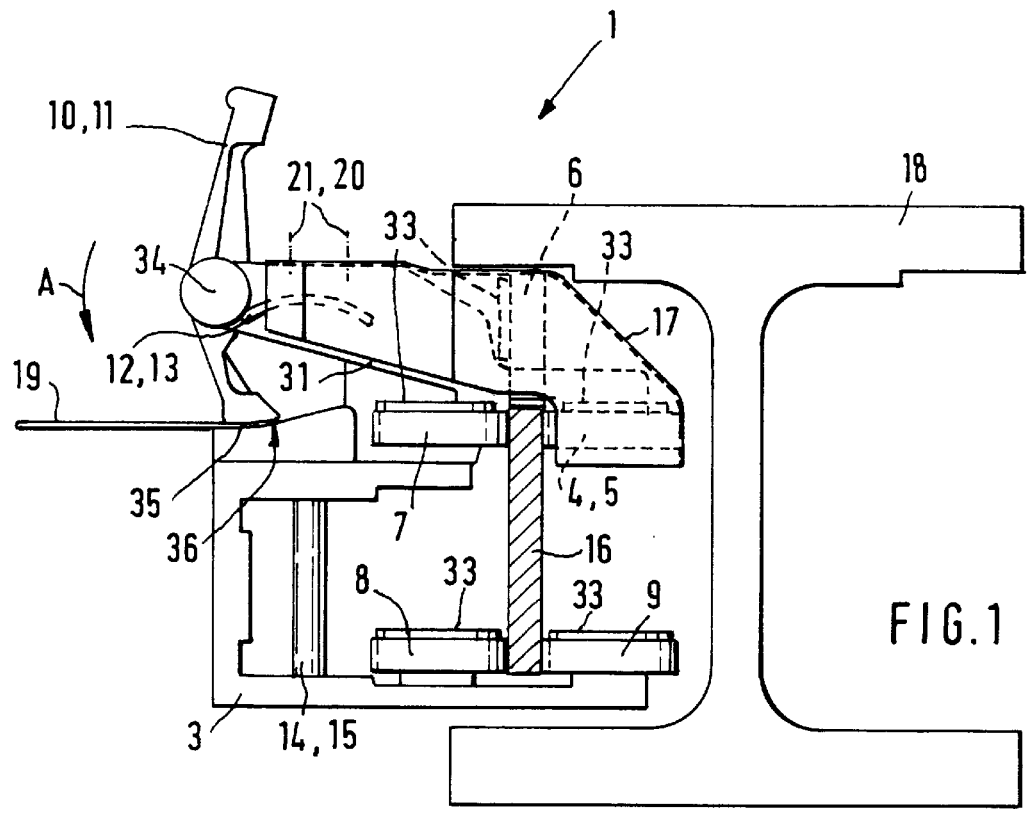
FIG. 1 shows a side view of a tenter clip, covered by a first embodiment of a protective hood.

FIG. 1 shows a side view of a tenter clip 1 which is arranged in a web support 18 of a film stretching machine. The web support has a double-T cross section. The tenter clip 1 forms a component of a tenter chain 30 (see FIG. 2), which can move along a closed guide path. The tenter clip 1 comprises a clamping body 2 and a rolling part 3, between which a film is clamped in a film clamping plane 19 during the transverse stretching. Three horizontal roller bearings 4, 5, 7, which form a triangular arrangement, and one vertical roller bearing 6 are situated in the clamping body 2. Two horizontal roller bearings 8 and 9 are arranged in the rolling part 3 of the tenter clip 1. The tenter chain 30 is guided over the vertical roller bearing 6. A protective hood 17, the outline of which is shown in the view according to FIG. 1, has a shape which is matched to the geometry of the roller bearings 4, 5, 6, as a result of which it is ensured that lubricant mist which escapes from the roller bearings is deposited on the inside of the protective hood 17.

The tenter clip 1 contains two flaps 10, 11, which are mounted rotatably about a pin 34 which is fastened on the clamping body 2. The arms of the flaps 10, 11 which point downward from the pin 34 clamp an edge strip of the film in the film clamping plane 19 between an underside 35 of the flaps and a bearing surface 36 of the clamping body 2. By rotating the flaps 10, 11 in an counterclockwise direction, in the direction of a curved arrow A, the clamping of the film is removed and, by rotating the flaps 10, 11 about the pin 34 in the clockwise direction, the film is clamped in. Flap springs 12 and 13, for example leaf springs, are mounted at one end in the clamping body 2 with preloading, while their other end is connected to the lower arm of the flaps 10 and 11, slightly below the pin 34. The flap springs 12 and 13 are curved convexly upward and exert a torque in the clockwise direction on the flaps 10 and 11, so that they hold the flaps in their closed position. A flexible, vertically clamped guide strip 16, which is fastened centrically on the web support 18 in a manner which is not shown, is situated in the tenter clip 1.

The following explanations relate by way of example to a 6-roller clip. They also apply accordingly to tenter clips having a different number of roller bearings, such as for example 7 or 9 roller bearings. The three horizontal roller bearings 4, 5 and 7 in the clamping body 2, as well as the two horizontal roller bearings 8 and 9 in the rolling part 3, bear from both sides against the guide strip. The guide strip comprises, for example, laminations, and forms corresponding running surfaces for the roller bearings resting thereon. The roller bearings 4, 5, 6 and 7 in the clamping body 2, as well as the roller bearings 8 and 9 in the rolling part 3, are equipped with coverings 33, which serve as dust protection for the roller bearings.

Figure 2:
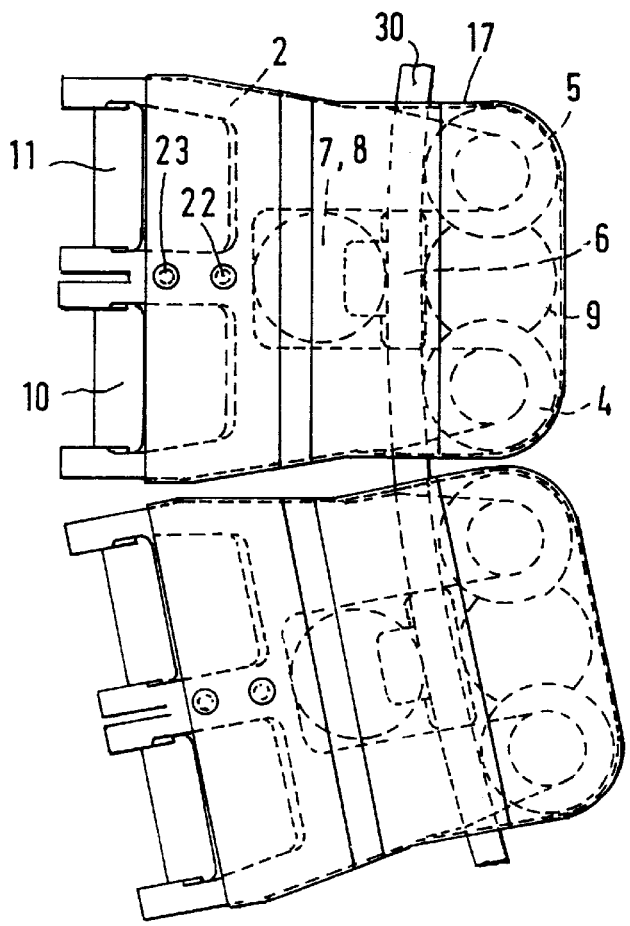
FIG. 2 shows a top view of the tenter clip according to FIG. 1.

As can be seen from the top view in FIG. 2 of the tenter clip 1, the protective hood 17 has two holes 22, 23 on the top side, which holes align with corresponding threaded holes 20, 21 in the clamping body 2. After the protective hood 17 has been placed onto the clamping body 2, it is fastened on the clamping body 2 by means of screws which extend through the holes 22 and 23 and are screwed into the threaded holes 20, 21. It can be seen from FIG. 2 that the two horizontal roller bearings 8, 9 in the rolling part 3 of the tenter clip 1 are aligned at right angles to the first and second horizontal roller bearings 4 and 5, respectively, in the clamping body 2. FIG. 2 shows two adjacent tenter clips which are arranged, for example, at the narrowest point of the reversal of the tenter chain 30. The two tenter clips are joined by means of link plates (not shown), which are rotatably movable about chain pins 14 and 15, as are shown in FIG. 1. These link plates may be connected to the chain pins via sleeves and bushes (not shown). These link plates are slid into one another in the region of the chain pins, i.e. one link plate has a thickness which is slightly less than the internal clearance of the two links of the other link plate. The teeth of a gearwheel (not shown), which drives the tenter chain 30, engage in the link plates.

The three horizontal roller bearings 4, 5 and 7 of the clamping body 2 are arranged in the form of a triangle in a plane, as can be seen from FIG. 2. The film clamping plane 19 runs centrically in the longitudinal direction with respect to the horizontal roller bearings. The vertical roller bearing 6 in FIG. 1 is aligned on the guide strip 16 and its bottom edge is situated at the level of the three horizontal roller bearings 4, 5 and 7. A first embodiment of the protective hood 17 surrounds the first and second horizontal roller bearings 4, 5 and the vertical roller bearing 6. The third horizontal roller bearing 7 is not surrounded by this protective hood 17 and is situated in the clamping body 2 between an inclined bottom edge 31 of the protective hood 17 and the top side of the rolling part 3. Although the third horizontal roller bearing 7 is not covered at the side by this first embodiment of the protective hood, it is covered at the top, so that the lubricant mist rising from the bearing can be deposited on the inside of the protective hood 17.

Figure 3:
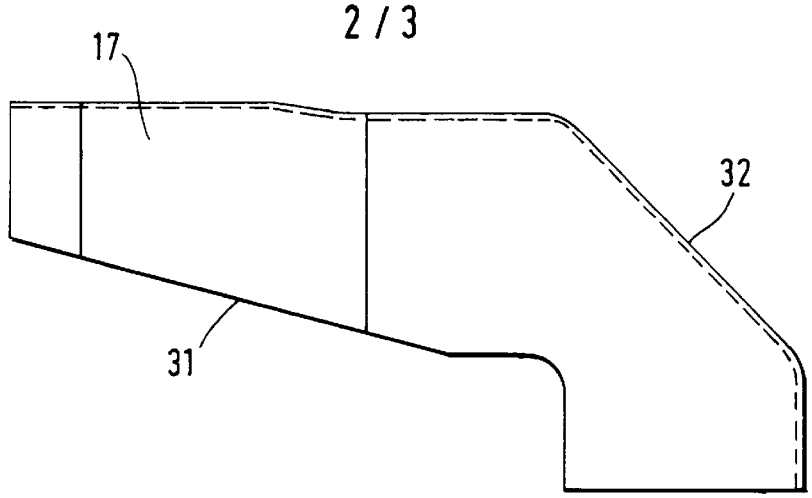
FIG. 3 shows a side view of the protective hood of the tenter clip according to FIG. 1.

It can be seen from the side view of the protective hood 17 in FIG. 3 that the latter, in addition to the inclined bottom edge 31, also has an inclined top edge 32.

Figure 4:
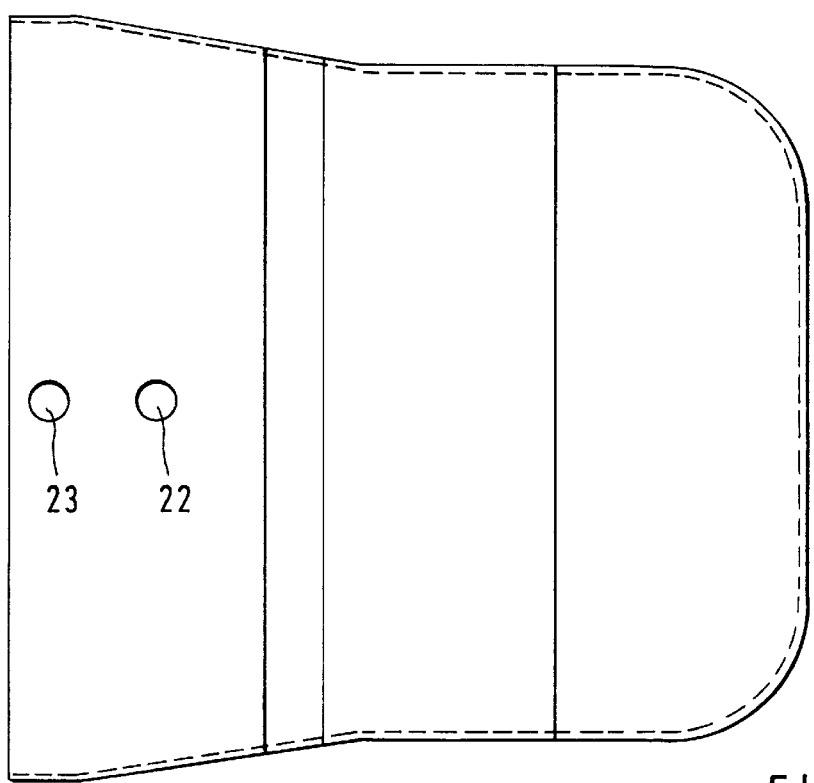
FIG. 4 shows a top view of the protective hood according to FIG. 3.

The top view of the protective hood 17 in FIG. 4 shows the holes 22, 23 and the rounded transition from the side faces to the front face. The side faces run obliquely outward in the direction of the rear face of the protective hood 17.

Figure 5:
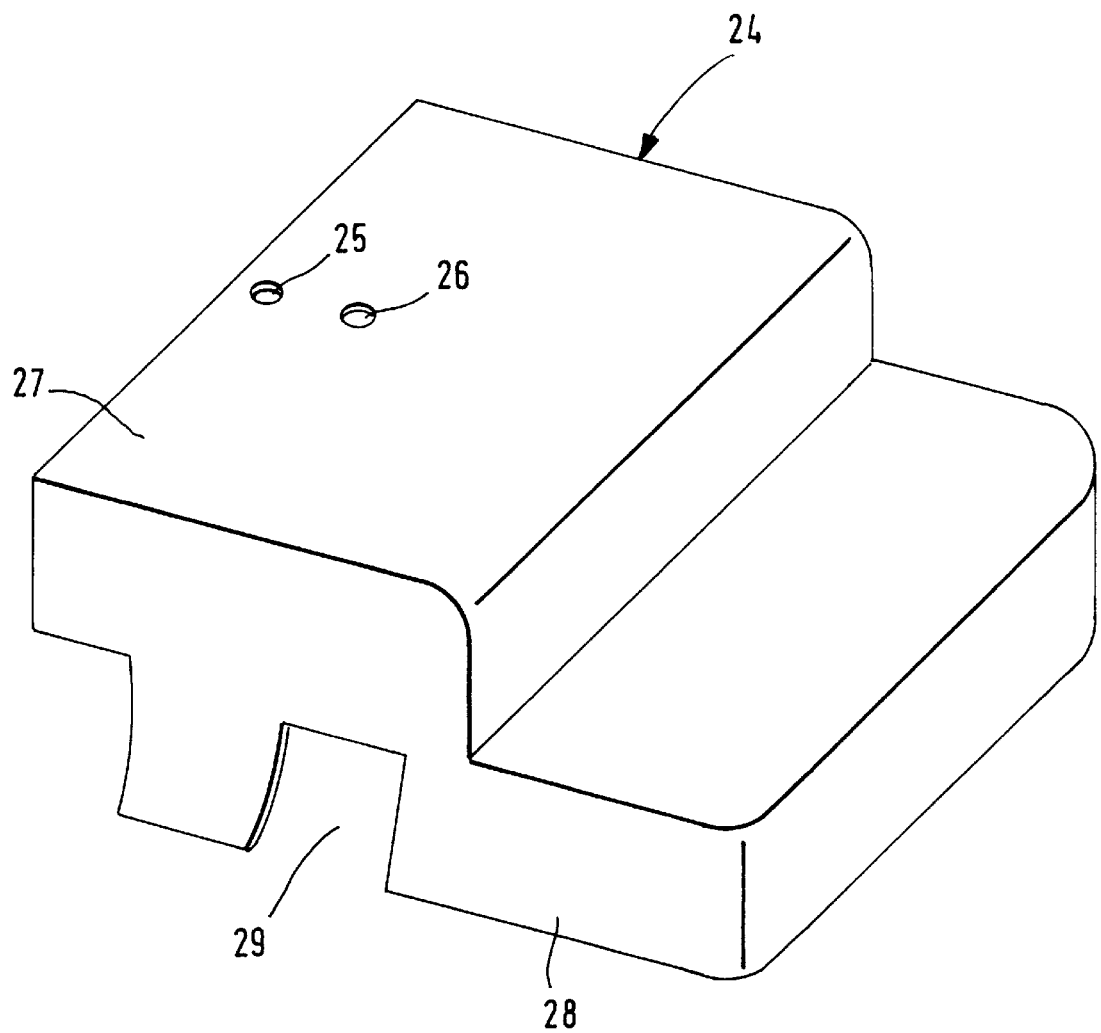
FIG. 5 shows a perspective view of a second embodiment of a protective hood.

FIG. 5 shows a second embodiment of a protective hood 24, which comprises a base part 28 and a top part 27 which is set back with respect to the front edge of the base part 28. The protective hood 24 covers the three horizontal roller bearings 4, 5 and 7 and the vertical roller bearing 6 of the clamping body 2 completely at the top. In order to avoid a buildup of heat beneath the protective hood 24, the base part 28 has an indentation 29 in each side face. As in the protective hood 17, two holes 25 and 26 in the top part 27 are situated on the top side of the protective hood 24, for the purpose of fastening the protective hood 24 on the clamping body 2 by means of two screws.

The protective hoods 17 and 24 consist either of press-formed material, such as sheet metal, or of thermoformed or injection-molded plastic. Like the clamping body 2, the rolling part 3 may also be covered by a protective hood, the geometry of which is matched to the shape of the roller bearings 8, 9 in the rolling part. In this case, the rolling part 3 may also contain more than two roller bearings.

Other embodiments of the tenter clip having a roller bearing will be apparent to those skilled in the art from consideration of the specification disclosed herein. It is intended that the specification be considered as exemplary only, with the true scope and spirit of the invention being indicated by the following claims.

What is claimed is:

1. A tenter clip for use in a film stretching machine having a web support onto which a vertical guide strip is clamped and onto which the tenter clip is fastened, the tenter clip comprising:
    a rolling part including at least one vertical roller bearing;
    a clamping body including at least two horizontal roller bearings; and
    a protective hood covering a substantial portion of the clamping body, the shape of the protective hood being substantially similar to the geometry of the at least two roller bearings of the clamping body,
    wherein the protective hood includes two holes on a top side, and the clamping body includes two threaded holes, and wherein the protective hood is fastened to the clamping body by screws which are guided through the holes of the protective hood and engaged with the threaded holes of the clamping body.

2. A tenter clip as claimed in claim 1, wherein the at least two horizontal roller bearings of the clamping body bear on opposite sides of the vertical guide strip.

3. A tenter clip as claimed in claim 1, wherein the at least one vertical roller bearing is aligned with and in contact with the vertical guide strip.

4. A tenter clip as claimed in claim 1, wherein the at least two horizontal roller bearings of the clamping body include three horizontal roller bearings.

5. A tenter clip as claimed in claim 4, wherein the protective hood encloses the three roller bearings of the clamping body and the vertical roller bearing of the rolling part.

6. A tenter clip as claimed in claim 1, the rolling part further including two vertical chain pins on which a chain link is supported, and a toothed wheel engaging the chain link.

7. A tenter clip as claimed in claim 1, wherein the protective hood comprises press-formed material.

8. A tenter clip as claimed in claim 7, wherein the press-formed material is selected from sheet metal, thermo-formed plastic and injection-molded plastic.

9. A tenter clip as claimed in claim 1, wherein the roller bearings of the clamping body and the rolling part include bearing covers.

10. A tenter clip as claimed in claim 1, wherein a protective hood encloses the rolling part, the shape of the protective hood being substantially similar to the geometry of the at least two roller bearings of the clamping body.

11. A tenter clip for use in a film stretching machine having a web support onto which a vertical guide strip is clamped and onto which the tenter clip is fastened, the tenter clip comprising:
    a rolling part including at least one vertical roller bearing;
    a clamping body including three horizontal roller bearings; and
    a protective hood covering a substantial portion of the clamping body, the shape of the protective hood being substantially similar to the geometry of the three roller bearings of the clamping body,
    wherein a film held by the film stretching machine extends in a film clamping plane and the three horizontal roller bearings of the clamping body lie in a bearing plane which is coplanar with the film clamping plane.

12. A tenter clip for use in a film stretching machine having a web support onto which a vertical guide strip is clamped and onto which the tenter clip is fastened, the tenter clip comprising:
    a rolling part including at least one vertical roller bearing;
    a clamping body including three horizontal roller bearings; and
    a protective hood covering a substantial portion of the clamping body, the shape of the protective hood being substantially similar to the geometry of the three roller bearings of the clamping body,
    wherein a bottom edge of the at least one vertical roller bearing is arranged at a level of the three horizontal roller bearings of the clamping body.

13. A tenter clip for use in a film stretching machine having a web support onto which a vertical guide strip is clamped and onto which the tenter clip is fastened, the tenter clip comprising:
    a rolling part including at least one vertical roller bearing;
    a clamping body including three horizontal roller bearings; and
    a protective hood covering a substantial portion of the clamping body, the shape of the protective hood being substantially similar to the geometry of the three roller bearings of the clamping body,
    wherein the rolling part further includes at least two horizontal roller bearings which are aligned at a right angle to two of the three roller bearings of the clamping body.

14. A tenter clip for use in a film stretching machine having a web support onto which a vertical guide strip is clammed and onto which the tenter clip is fastened, the tenter clip comprising:
    a rolling part including at least one vertical roller bearing;
    a clamping body including three horizontal roller bearings; and
    a protective hood covering a substantial portion of the clamping body, the shape of the protective hood being substantially similar to the geometry of the three roller bearings of the clamping body, wherein a first and a second of the three roller bearings of the clamping body and the vertical roller bearing of the rolling part are enclosed by the protective hood, and wherein a third of the three roller bearings of the clamping body is arranged between an inclined bottom edge of the protective hood and a top side of the rolling part.

15. A tenter clip for use in a film stretching machine having a web support onto which a vertical guide strip is clamped and onto which the tenter clip is fastened, the tenter clip comprising:

a rolling part including at least one vertical roller bearing;

a clamping body including three horizontal roller bearings; and a protective hood covering a substantial portion of the clamping body, the shape of the protective hood being substantially similar to the geometry of the three roller bearings of the clamping body, wherein the protective hood encloses the three horizontal roller bearings of the clamping body and the vertical roller bearing of the rolling part, and includes a cut-out in each of two side walls for reduction of heat beneath the hood.

* * * * *